United States Patent
Eckstein et al.

(12) 
(10) Patent No.: US 6,339,117 B2
(45) Date of Patent: *Jan. 15, 2002

(54) WHITENED POLYMERS AND THE USE THEREOF IN COATING SLIPS FOR COATING SUBSTRATES

(75) Inventors: Udo Eckstein, Köln; Siegfried Korte, Odenthal, both of (DE); Ulrich Feldhues, Mount Pleasant, SC (US); Hans-Peter Geiger, Rösrath (DE); Bernhard Hunke, Eitorf (DE); Thomas Roick; Günter Sackmann, both of Leverkusen (DE)

(73) Assignee: Bayer Aktiengesellschaft, Leverkusen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,208

(22) PCT Filed: Jul. 14, 1998

(86) PCT No.: PCT/EP98/04355

§ 371 Date: Feb. 28, 2000

§ 102(e) Date: Feb. 28, 2000

(87) PCT Pub. No.: WO99/05188

PCT Pub. Date: Feb. 4, 1999

(30) Foreign Application Priority Data

Jul. 25, 1997 (DE) .......................... 197 32 032

(51) Int. Cl.[7] .......................... C08K 5/34; C08L 33/18; C08L 9/02; B05D 3/00; B32B 27/30
(52) U.S. Cl. .......................... 524/86; 524/87; 524/89; 524/90; 524/91; 524/92; 524/94; 524/820; 524/827; 524/828; 524/831; 427/385.5; 427/389.9; 427/391; 427/393; 427/393.5; 427/393.6; 427/394; 427/395; 427/396; 442/130; 442/154; 442/155; 442/164; 428/512; 428/513; 428/514; 428/522

(58) Field of Search .................. 524/86, 87, 89, 524/90, 91, 92, 94, 820, 827, 828, 831; 427/385.5, 389.9, 391, 393, 393.5, 393.6, 394, 395, 396; 442/130, 154, 155, 164; 428/512, 513, 514, 522

(56) References Cited

U.S. PATENT DOCUMENTS

| | | | | |
|---|---|---|---|---|
| 3,666,680 A | * | 5/1972 | Briggs | 252/301.21 |
| 4,290,931 A | * | 9/1981 | Nolken et al. | 524/123 |
| 4,384,069 A | * | 5/1983 | Wendel et al. | 524/521 |
| 4,777,197 A | * | 10/1988 | Nolken et al. | 524/145 |
| 5,186,993 A | * | 2/1993 | Hallen-Abberton et al. | 525/84 |
| 5,356,985 A | * | 10/1994 | Sackman et al. | 524/460 |
| 5,747,585 A | * | 5/1998 | Mitacek et al. | 524/845 |
| 5,869,589 A | * | 2/1999 | Raynolds et al. | 526/320 |
| 5,919,716 A | * | 7/1999 | Raynolds et al. | 442/154 |

FOREIGN PATENT DOCUMENTS

| | | | |
|---|---|---|---|
| DE | 195 00 195 | * | 7/1996 |
| EP | 400410 | | 12/1990 |
| EP | 0 590 460 | * | 4/1994 |
| EP | 0 860 437 | * | 8/1998 |
| GB | 1417071 | | 12/1975 |
| JP | 133418 | * | 12/1974 |

OTHER PUBLICATIONS

Chemistry & Chemical Tech., vol. III, 2$^{nd}$ Ed. (month unavailable) 1961, pp. 1648–1649, J. P. Casey "Pulp and Paper".

McGraw Hill, vol. 2, (month unavailable) 1951, p. 497, "Pulp & Paper Manufacture".

* cited by examiner

Primary Examiner—Peter Szekely
(74) Attorney, Agent, or Firm—Joseph C. Gil; Richard E.L. Henderson

(57) ABSTRACT

The present invention relates to polymers whitened with optical brighteners obtained by
(a) emulsion polymerization of acrylonitrile with or without a comonomer in the presence or absence of a graftable substrate, and
(b) addition of an optical brightener before, during, or after the emulsion polymerization.

15 Claims, No Drawings

WHITENED POLYMERS AND THE USE THEREOF IN COATING SLIPS FOR COATING SUBSTRATES

The invention relates to whitened polyacrylonitriles and acrylonitrile copolymers, especially as aqueous dispersions, to coating slips comprising them, and to their use for coating a wide variety of substrates.

In addition to the customary white pigments, especially china clay and calcium carbonate, the coating slips generally include anionic whiteners for the purpose of optical brightening, examples being those of the bis-triazinyl-aminostilbene-disulfonic acid type. These whiteners, however, lead only to highly unsatisfactory white effects and to very low grayness limits (=whitener concentration at which further addition of whitener produces no increase, or even a decrease, in whiteness). Furthermore, the whitener types referred to possess inadequate lightfastness in the coating slips.

DE-A-195 00 195 describes how whitened, finely divided polymer materials affixed with brighteners suitable for the polymer material can be used as powders or as dispersions for whitening paper coating slips based on synthetic binders. This method is still in need of improvement, however, in terms of the rheological properties when the whitened polymer powder is used, or in terms of the solids contents of their dispersions.

The preparation of whitened coatings on various substrates, especially on coated papers and cards with high whiteness, a high grayness limit and good lightfastness, is a difficult problem which has not been solved satisfactorily to date.

It has now been found, surprisingly, that when specific whitened polymers are used in coating slips, they give the coatings produced therewith on a wide variety of substrates very high whitenesses, high grayness limits, high lightfastnesses, and high bleedfastnesses.

The invention therefore provides polyacrylonitriles or acrylonitrile copolymers, referred to below simply as polymers, which are whitened by means of optical brighteners and are obtainable by emulsion polymerization of acrylonitrile with or without comonomers, in the presence or absence of graftable substrates, with the addition of an optical brightener before, during or after the emulsion polymerization.

In one preferred embodiment the polymers of the invention are in the form of their aqueous dispersions.

The aqueous polymer dispersion contains preferably:
a) 1–65% by weight, in particular 10–55% by weight, of polymer of the invention, based on the dispersion, and
b) 1–15% by weight, in particular 5–10% by weight, of surface-active substances, based on polymer of a).

The aqueous polymer dispersion may additionally include customary additives such as preservatives, preferably from 0 to 15% by weight, based on the polymer of component a).

Suitable surface-active substances are preferably anionic and/or nonionic surfactants.

Preferred surface-active substances are the graftable substrates of types I to III below, preferably those of types I and II, and, in particular, those of type I.

Examples of suitable preservatives are methyl- and chloromethyl-isothiazolin-3-one, benzisothiazolin-3-one, or mixtures thereof.

The polymers of the invention are preferably finely divided and in particular have an average particle size (measured by the method of laser correlation spectroscopy) of <1 μm, preferably 50–800 nm, in particular 50–500 nm, and, with particular preference, 50–400 nm.

The polymers preferably contain 50 or more mol-% of acrylonitrile units. Examples of suitable comonomers are nonionic and/or ionic-ethylenically unsaturated comonomers.

Preferred nonionic comonomers are alkyl esters of acrylic and methacrylic acid, preferably $C_1$–$C_8$ alkyl esters, and also ethoxylated and propoxylated esters of acrylic and methacrylic acid, styrene and α-methylstyrene and their derivatives, vinyl carboxylates, preferably vinyl acetate, conjugated dienes such as, for example, butadiene or isoprene, methacrylonitrile, vinyl chloride and vinylidene chloride, N-alkyl and N-aryl-substituted maleimides, and also hydrophilicizing comonomers such as acrylamides and methacrylamides, acrylic and methacrylic acid, N-vinylamides, such as, for example, 1-vinyl-2-pyrrolidone.

Examples of suitable ionic comonomers are vinylsulfonic acid and its salts, methallylsulfonic acid and also allylsulfonic acid and salts thereof, styrenesulfonic acid and its salts, (2-acrylamido-2-methyl)-propanesulfonic acid, its esters and its salts, (3-sulfopropyl)-acrylic acid and its salts, (3-sulfopropyl)-acrylic esters, and also the alkyl esters and oxyalkyl esters of said vinylic sulfonic acids.

Particularly preferred comonomers are alkyl acrylates, styrene, and butadiene/styrene mixtures. Preferably, however, it is also possible to operate with acrylonitrile as sole monomer.

In one preferred embodiment the whitened polymers of the invention are obtainable by emulsion polymerization in the presence of graftable substrates. These graftable substrates are preferably polymeric emulsifiers containing sulfonate groups. Particularly suitable are polymers of types I and II, which preferably have average molecular weights of $M_w$>5000 g/mol. Likewise preferred are poly- and oligourethanes of type III, which preferably have an average molecular weight of >1000 g/mol.

The emulsifier of type I corresponds to the formula (I) and that of type II to the formula (II)

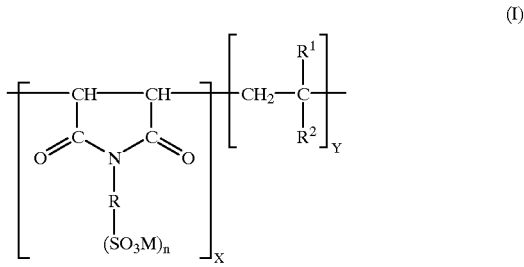

(I)

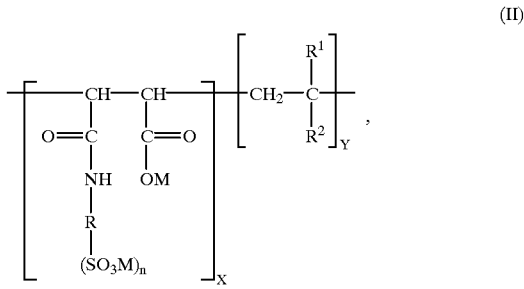

(II)

in which
M denotes a cation-forming radical, preferably H, Na, K, $NH_4$ or $R_3NH_3$,
n denotes 1 or 2,
R denotes a hydrocarbon chain having 1 to 10 carbon atoms or an aromatic radical having 6 to 10 carbon atoms, or preferably —$(CH_2)_2NH(CH_2)_2$— or a radical derived from $C_1$–$C_4$ alkane or from benzene, methylbenzene or naphthalene, $R^1$ denotes H or —$CH_3$, $R^2$ denotes H, $C_1$–$C_{16}$ alkyl, preferably —$CH_3$, —$C_2H_5$, —$C_4H_9$, —$CH_2$—$C(CH_3)_3$, —$C_{14}H_{29}$, —$C_{16}H_{33}$ or phenyl, R3 denotes a hydrocarbon radical of an amine, x, y are chosen such that the average molecular weight $M_w$ of the polymers (I) and (II) is from 2000 to 500,000, preferably from 5000 to 100,000, and the ratio x:y=from 1:4 to 1:1, preferably from 1:3 to 1:1.

Particularly preferred emulsifiers are those of the formulae (I) and (II), in which 1A)
  $R_1$=$CH_3$ and
  $R_2$=—$CH_2$—$C(CH_3)_3$ or
2A)
  $R_1$=$CH_3$ and
  $R_2$=$CH_3$ or
3A)
  $R_1$=H and
  $R_2$=$C_6H_5$,
where in each case
  R=—$CH_2CH_2$—,
  M=Na,
  n=1 and
  x:y=from 1:1.0 to 1:1.1.

Very particular preference is given to the emulsifier of the type 1A).

Emulsifiers of the formulae I and II are known, for example, from EP-A 590 460.

Emulsifiers of the type III are the oligourethanes known from EP-A 400 410 which are used in connection with the free-radically initiated emulsion polymerization for preparing surface sizing agents for paper.

Particular preference is given as emulsifiers of the type III to the oligourethanes specified on p. 7 of EP-A 400 410, especially those obtainable by reacting a macrodiol and an oligoisocyanate having an NCO functionality of >2.

A macrodiol is, for example, a polyester of adipic acid, hexanediol, neopentyl glycol having an average molecular weight $M_w$=1700 g/mol. The oligoisocyanate is, for example, a hexamethylene diisocyanate (HDI) based trimer of the isocyanate type (f=3) and higher molecular mass oligomers (f=3) derived therefrom.

At medium and high molecular weights, suitable linear and branched polyacrylonitriles and acrylonitrile copolymers exhibit intrinsic viscosities (measured in dimethylformamide at 20° C.) of [η]=from 0.5 to 10.0 dl/g, preferably of [η]=from 1.0 to 5.0 dl/g. High molecular mass products exhibit heightened long-chain branching.

Preferred polymers are those modified by strongly acidic groups. Preferred strongly acidic groups are sulfonate groups, the amount of strongly acidic groups being preferably 50–500, particularly 100–500, milliequivalents/kg of polymer.

The incorporation of strongly acidic groups into the copolymer can take place, for example:

a) by using the above-described graftable emulsifiers containing sulfo groups,
b) by using comonomers containing sulfonic acid groups and/or sulfonate groups, preferably the abovementioned ionic-ethylenic comonomers, and/or
c) by the free-radical initiator components, preferably by using the initiator system: persulfate/sulfite.

The amount of graftable substrates, especially of the abovementioned emulsifiers, which is preferably used for the emulsion polymerization is 2–20% by weight, preferably 2–10% by weight, based on the total amount of monomers to be polymerized.

The polymers obtained in the presence of graftable substrates, especially their dispersions, include not only homo- and/or copolymers of the acrylonitriles used for the polymerization and/or mixtures thereof with other monomers, preferably including fractions of graft polymer of the monomers used onto the polymeric emuslifiers, but also fractions of the ungrafted, graftable substrates, especially of the polymeric emulsifiers.

Based on the amount of emulsifier used, preferably 50 or more mol-% is grafted. Depending on the chosen polymerization conditions such as temperature, initiator system and nature of the comonomers, the grafting yield when using the polymeric emulsifiers specified as preferred is from 50 to 80 mol-%.

Particularly suitable optical brighteners are those commonly used in the textiles sector for whitening polyacrylonitrile. Particular preference is given to neutral brighteners, but especially cationic brighteners. Particularly suitable are optical brighteners which on the corresponding fiber material in the textiles sector have lightfastnesses of at least 4 as determined in accordance with the xenon test in accordance with the method by way of the guidelines determining colorfastness properties in accordance with DIN 54 004. Particularly advantageous for this application are all brighteners having lightfastnesses of 5–7.

Brigheners used with preference for the polymer dispersions are compounds of the formula:

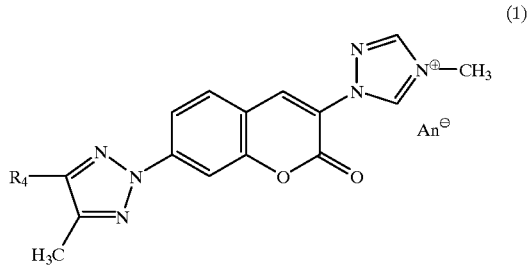

(1)

in which $R_4$ denotes ethyl or phenyl, and $An^\ominus$ represents an anion, or

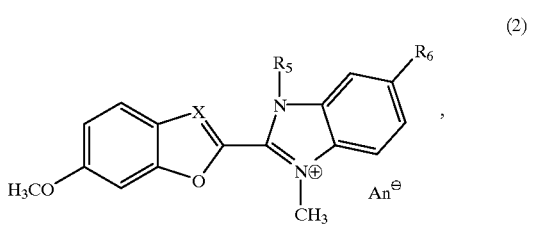

(2)

in which

X represents CH or N, $An^\ominus$ represents an anion, $R_5$ represents $CH_3$ or $CH_2$—$C_6H_5$, and
$R_6$ represents H or $SO_2$—$CH_3$, or (3)

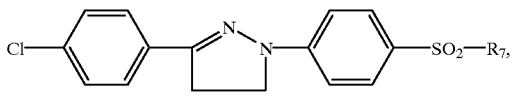

in which
$R_7$ represents $NH_2$, $CH_3$, $C_2H_4$—OH, NH—$C_3H_6$—N$(CH_3)_2$, $CH_2$—CH($CH_3$)—N($CH_3$)$_2$, $C_2H_4$—CONH—$C_2H_4$—N($CH_3$)$_2$, $C_2H_4$—O—CH($CH_3$)—$CH_2$—N($CH_3$)$_2$, NH—$C_3H_6$—N($CH_3$)$_3{}^+$An$^\ominus$, $C_2H_4$—N($CH_3$)$_3{}^+$An$^\ominus$, $C_2H_4$—CONH—$C_2H_4$—N($CH_3$)$_3{}^+$An$^\ominus$, $CH_2$—CH($CH_3$)—N($CH_3$)$_3{}^+$An$^\ominus$, $C_2H_4$—O—CH($CH_3$)$CH_2$—N($CH_3$)$_3{}^+$An$^\ominus$,
where An$^\ominus$ represents an anion, preferably the anion of a mineral acid or —$O_3SOCH_3$ or (4)

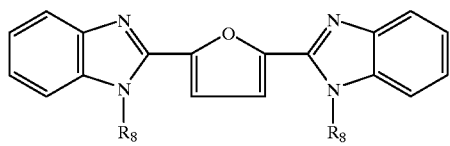

in which
$R_8$ denotes H or $CH_3$, or (5)

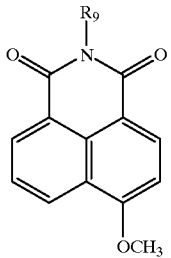

in which
$R_9$ represents $CH_3$, $CH_2C(CH_3)_2$—$CH_2$—N$(CH_3)_3{}^+$An$^\ominus$ or

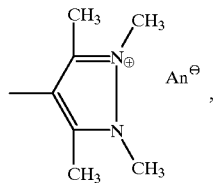

where An$^\ominus$ denotes an anion, preferably the anion of a mineral acid or —$O_3SOCH_3$.

Preferred polyacrylonitriles or acrylonitrile copolymers of the invention are whitened with optical brighteners of the formula (1), (2) or (3), especially (1) or (2).

The emulsion polymerization generally takes place such that acrylonitrile and/or its mixtures with the comonomers and, if desired, graftable substrates in the presence of emulsifiers are polymerized in aqueous emulsion, using free-radical initiators, in a manner known per se.

Suitable initiators are persulfates, hydrogen peroxide and various other organic peroxides which decompose below 100° C., and also the redox systems which respond in the temperature range from 20 to 100° C., such as, for example, $H_2O_2$/Rongalit, $H_2O_2$/thioglycol and t-butyl hydroperoxide/ascorbic acid. Particularly advantageous is the system persulfite/$SO_2$, which is active at temperatures of 40–70° C. and which, by virtue of the incorporation of sulfonate and sulfate end groups, increases the level of acidic groups present.

Particularly preferred emulsifiers are the above-described polymeric emulsifiers, containing sulfonic acid groups, of the formulae (I) to (III).

To conduct the emulsion polymerization it is preferred to include all or some of an aqueous solution of the emulsifier, preferably of the polymeric emulsifier described above, in the initial charge and then to add the monomers and the initiator gradually, for example over 2 to 6 hours, preferably separately. In the case where some of the emulsifier is included in the initial charge, the remainder can then be metered in gradually, for example over 2 to 6 hours, together with the monomers and the initiator, preferably in separate streams. Alternatively, it is possible to add the emulsifier, initiator and the monomers separately and continuously throughout the polymerization period and to include only water in the initial charge.

It is also possible to operate batchwise, in which case, for example, emulsifier, monomer mixture and initiator are introduced together and this charge is then heated, for polymerization, to the desired polymerization temperature.

Depending on the decomposition characteristics of the initiators used, the emulsion polymerization is conducted at temperatures from 20 to 100° C., preferably in the range from 40 to 80° C.

The product of the polymerization reaction comprises generally finely divided aqueous polymer emulsions which are free from precipitated coagulum.

Thus with the process of emulsion polymerization it is possible, for example, to produce the whitened polymers of the invention as aqueous dispersions in the case of acrylonitrile homopolymers, preferably with solids contents of up to 45% by weight, and, in the case of acrylonitrile copolymers, preferably with solids contents of up to 65% by weight.

The resulting dispersions are extremely stable to additions of electrolyte, to temperature effects, and to the action of shear forces.

The optical brightener can be applied to the polymer particles, for example, in accordance with the methods described in DE-A-195 00 195. The process of the invention has the particular feature that a suitable optical brightener is added before, during or after the emulsion polymerization.

In one particularly preferred embodiment the brightener, preferably a water-soluble cationic brightener, alone or in combination with further optically brightening compounds, is mixed into the aqueous dispersions of the polymers containing strongly acidic groups, and is then caused to attach to the polymer particles at elevated temperature. If desired, further auxiliaries are used.

The attachment of the optical brightener preferably takes place above the hydrothermal softening temperature (TgH$_2$O) of the polymer, preferably at 25–150° C., in particular at 50–100° C. This takes place largely with retention of the original particle size distribution of the emulsion polymers.

It is advantageous to cause the optical brighteners to act on the dispersion comprising emulsion polymers, which still contains residual monomers. Subsequently, the monomers are separated off, preferably by distillation. It has been found that, in the case of this preferred attachment variant, the takeup capacity on the one hand and the attachment rate of the brightener on the other hand are increased.

The amount of the optical brighteners used, based on the polymer, is guided by the desired brightener effect and is preferably 0.1–2% by weight of brightener, based on the polymer solids fraction in the dispersion.

The invention additionally provides aqueous dispersions containing more than 30% by weight, especially 31–65% by weight and, with particular preference, 40–65% by weight, based on the dispersion, of a whitened polyacrylonitrile and/or acrylonitrile copolymer. This aqueous dispersion of the invention contains preferably 1–15% by weight, especially 2–10% by weight and, with particular preference, 5–10% by weight of at least one surface-active substance, based on whitened polymer. The preferred embodiments of these dispersions in terms of polymer, surface-active substances and possible further additives correspond to those for the abovementioned dispersions. The polymer is preferably obtained by the method of emulsion polymerization, in particular in accordance with the process described above.

The aqueous polymer dispersions of the invention may include as further additives, like additives already described above to the whitened, finely divided polymer dispersions used in accordance with the invention, in the stated amounts, examples being surface-active substances, preservatives, etc.

The invention additionally provides acrylonitrile homo- and/or copolymers whitened with optical brighteners, said polymers having been emulsion-polymerized in the presence of at least one polymeric emulsifier of the formulae I to III.

The preferred embodiments correspond to those indicated above.

The whitened polymers of the invention, especially in the form of their aqueous dispersions, can be used without further treatment or purification or can be admixed with pigments and/or further auxiliaries.

The invention additionally provides aqueous coating slips having a solids content of 25–80% by weight, especially 50–70% by weight, and containing:

| | |
|---|---|
| 30–70, | preferably 40–60% by weight of at least one inorganic pigment, based on the solids content, |
| 10–50 | % by weight of whitened polyacrylonitrile and/or acrylonitrile copolymer, based on the inorganic pigment, and |
| 5–15 | % by weight of at least one binder, based on the inorganic pigment. |

The polymer of the invention or the dispersion of the invention comprising a whitened polymer is preferably employed in the coating slips of the invention.

The coating slips of the invention may also include wet strength agents, dispersants and, if desired, further additives.

Suitable inorganic pigments are preferably clay, kaolin, barium sulfate, satin white, silica, alumina, aluminum silicate, titanium dioxide, talc, chalk and mixtures thereof.

These pigments are preferably used in the form of an aqueous slurry.

Examples of suitable binders are those based on polymeric binding agents, such as, for example, butadiene-styrene, styrene-butyl acrylate, acrylonitrile-butadiene-styrene, styrene-butadiene-alkyl acrylate, alkyl acrylate, acrylonitrile-alkyl acrylate, acrylonitrile-styrene, ethylene-vinyl chloride, and ethylene-vinyl acetate copolymers and also the homopolymers polyethylene, polyvinyl chloride, polyvinylidene chloride, polyvinyl acetate, and polyaddition compounds such as polyurethanes.

Also outstandingly suitable, however, are natural binding agents such as, for example, starch, degraded starch, alginates and proteins, such as gelatin, casein and soy protein, for example. Sodium carboxymethylcellulose, polyvinyl alcohol, and synthetic, acrylate-based thickeners are also suitable. Examples of suitable dispersants are sodium polyacrylates, sodium polyphosphate and sodium citrate.

The coating slips per se into which the polymers of the invention, or the dispersions of the invention comprising whitened polymers, can be incorporated are known and are described, for example, in J. P. Casey "Pulp and Paper", Chemistry and Chemical Technology, 2nd Ed. Vol. III, pp. 1648–1649 and McGraw-Hill "Pulp and Paper Manufacture", 2nd and 5th Ed. Vol. II, p. 497.

The invention additionally provides for the use of such coating slips to coat substrates.

Examples that may be mentioned of substrates suitable for coating are:

Paper, such as coated paper, photographic paper, etc., paperboard, wood, polymer films, textiles and also nonwoven materials and building materials such as stone, plaster, etc. The abovementioned coating slips are preferably used to coat coated papers, photographic papers, and paperboard.

With the coating slip of the invention it is possible to coat paper and paperboard with the customary coating apparatus: for example, with an air knife, a coating knife, a brush, a roller, a knife coater, a rod or any other coating apparatus common in the paper industry.

The coating slips of the invention can be used in particular for coating paper, especially for chromoprints, art prints/picture prints, offset prints, gravure prints, and paperboard.

The aqueous coating slips used in accordance with the invention can comprise additional dispersants and/or emulsifiers and also customary anionic or cationic and/or nonionic surface-active substances, as are described, for example, in DE-A-2 334 769, pp. 8–10 (corresponds to GB-A-1 417 071). Preference is given in this context to anionic and/or nonionic surfactants.

The aqueous coating slips of the invention can be used, for example, as topcoats. A particular advantage of this use in accordance with the invention lies in the very high gloss and extraordinary smoothness of the coated papers obtained in this case.

The invention additionally provides the substrates, especially papers, coated with the coating slips of the invention.

The invention is illustrated using the following examples. The parts indicated in the examples are parts by weight; the percentages, unless stated otherwise, likewise relate to the weight of the substances employed.

EXAMPLES

Example 1

100 g of a fine acrylonitrile copolymer dispersion (solids content (SC): 48.6% of polymer, average particle size: about 140 nm; $[\eta]_{DMF}$=3.1 dl/g; polymer-bound sulfonate group content: 120 meq./kg), containing 55.4% of an acrylonitrile-methyl acrylate copolymer (in the proportion of 55/45) and 4.6% of a polymeric emulsifier of type 1A that is grafted therewith (average molar weight $M_w$: 20,000 g/mol; $[\eta]_{DMF}$=3.1 dl/g), were treated for 20 minutes at 90° C. with a) 0.1, b) 0.2, and c) 0.4% of the optical brightener, based on polymeric solids fraction, of the formula

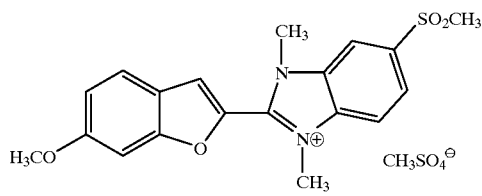

Sieving was carried out at 60° C. to remove a little sieve residue (8 mm). The whitened, fine polymer dispersion present was coated onto base paper using a manual knife coater (coat weight: about 15 g/m²). The coated papers exhibit the following whitenesses:

TABLE 1

| Example 1 | Whitener based on polymer in % | Whiteness Berger | Whiteness CIE |
|---|---|---|---|
|  | none | 85.3 | 84.3 |
| a) | 0.1 | 112.6 | 112 |
| b) | 0.2 | 126.2 | 123.6 |
| c) | 0.4 | 131.3 | 126.4 |

The Berger whiteness is calculated in accordance with the formula of Berger.

$W=Ry+3(Rz-Rx)$

Rx, Ry and Rz are the readings from a three-filter photometer

A. Berger, Weißgradformeln und ihre praktische Bedeutung [whiteness formulae and their practical significance]

Die Farbe 8 (1956) 4/6, 187–202

The CIE method was proposed in 1986 by the Commission international de l'éclairage.

The evaluation of whiteness, Colorimetry Second Edition, Publication CIE No. 15.2 (1986) pp. 36–38.

Example 2

100 g of a fine acrylonitrile copolymer dispersion (SC: 40% of polymer, average particle size: about 480 nm; polymer-bound sulfonate group content: 340 meq/kg), containing 51% of an acrylonitrile-methyl acrylate-sodium styrene sulfonate copolymer (in the proportion of 53.5/44.5/2.0) and 9% of a polymeric emulsifier of type 1A which is grafted therewith (having an average molar weight $M_w$: 20,000 g/mol, $[\eta]_{DMF}$=1.7 dl/g), were treated for 2 hours at room temperature and 1 h at 70° C. with a) 0.1, b) 0.2, c) 0.4 and d) 0.8% of the optical brightener, based on polymeric solid fraction, from Example 1. Sieving was carried out at room temperature to remove a little sieve residue (8 mm). The resulting whitened, fine dispersion was coated onto base paper using a manual knife coater (coat weight: about 15 g/m²). The coated papers were exposed at a distance of about 15 cm using the daylight fluorescent lamp Sylvania Daylight F 20 W/DRS for 72 h, and exhibited the following whitenesses before and after exposure:

TABLE 2

| Example 2) | Brightener in %, based on polymer | CIE whiteness before exposure | CIE whiteness after exposure | Decrease in whiteness due to exposure (difference) |
|---|---|---|---|---|
|  | none | 80.6 | 80.3 | 0.3 |
| a) | 0.1 | 121.9 | 122.3 | 0 |
| b) | 0.2 | 129.1 | 129.0 | 0.1 |
| c) | 0.4 | 143.6 | 143.1 | 0.5 |
| d) | 0.8 | 148.2 | 147.4 | 0.8 |
| e) | 1 | 150 | 148.9 | 1.1 |

The resulting stable, whitened polymer dispersion showed excellent white effects with high lightfastnesses, as a topcoat, and, moreover, was easy to incorporate into paper coating slips.

Example 3

100 g of a fine acrylonitrile copolymer dispersion (SC: 35% of polymer, average particle size: about 720 nm; polymer-bound sulfonate group content: 340 meq/kg), containing 51% of an acrylonitrile-methyl acrylate-sodium styrenesulfonate copolymer (in the proportion of 53.5/44.5/2.0) and 9% of a polymeric emulsifier of type 1A which is grafted therewith (having an average molar weight $M_w$: 20,000 g/mol, $[\eta]_{DMF}$=1.8 dl/g), were treated for 2 hours at room temperature and 1 hour at 70° C. with a) 0.1, b) 0.2 and c) 0.4% of the optical brightener, based on polymeric solid fraction, of the formula

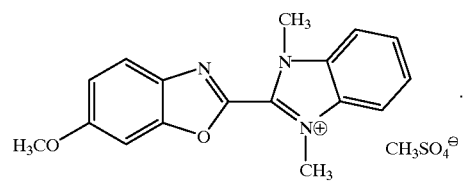

The resulting whitened, fine dispersion was coated onto base paper using a manual knife coater (coat weight: about 30 g/m²). The subsequent daylight exposure took place as described in Example 2. The coated papers exhibited the following whitenesses before and after exposure.

TABLE 3

| Example 3) | Brightener in %, based on polymer | CIE whiteness before exposure | CIE whiteness after exposure | Decrease in whiteness due to exposure |
|---|---|---|---|---|
|  | none | 83.4 | 83.1 | 0.3 |
| a) | 0.1 | 118.1 | 115.6 | 2.5 |
| b) | 0.2 | 124.9 | 120.1 | 4.8 |
| c) | 0.4 | 132 | 122.8 | 9.2 |

Example 4

A reactor equipped with stirrer and four metering devices was charged under a nitrogen blanket with 650 parts by weight of deionized water, 105 parts by weight of the polymeric emulsifier from Example 1 and 7.4 parts by weight of sodium styrene-sulfonate. After conditioning at 60° C., 4 parts by weight of iron(II) sulfate*7H$_2$O (0.1% strength) were added in order to activate free-radical polymerization, and the following solutions were metered in at a uniform rate over the course of 5 hours:

| Feed 1: | 610 parts by weight of acrylonitrile |
| --- | --- |
| | 499 parts by weight of methyl acrylate |
| Feed 2: | 370 parts by weight of deionized water |
| | 1.85 parts by weight of butyl acrylate |
| Feed 3: | 370 parts by weight of deionized water |
| | 1.40 parts by weight of Rongalit ® C (NaSO$_2$—CH$_2$—OH.2H$_2$O) |
| Feed 4: | 370 parts by weight of deionized water |
| | 14.80 parts by weight of sodium styrenesulfonate |

Following the end of the metered additions reaction was continued for 1 hour. This gave an emulsion (SC: 39.5%) containing 51% of an acrylonitrile-methyl acrylate-sodium styrenesulfonate copolymer (in the proportion of 53.5/44.5/2.0) and 9% of a polymeric emulsifier of type 1A grafted therewith and having an average molar weight $M_w$: 20,000 g/mol; $[\eta]_{DMF}$=1.75 dl/g. The polymer-bound sulfonate group content is about 340 meq/kg of polymer.

For whitening, in each case 500 parts by weight of the emulsion polymer, which still contained residual monomers, were treated at 60° C. for 1.5 h with an aqueous solution (15% strength) of the optical brightener from Example 1 in an amount of a) 0.2%, b) 0.4% and c) 0.8%, based on the polymeric solids fraction. Thereafter, the residual monomer fractions were removed by vacuum distillation with the addition of 50 parts by weight of water. Subsequently, the final filtration through a filter cloth with a mesh size of 30 μm gave the whitened emulsion polymers. The solids content and the average particle size (determined by laser correlation spectroscopy) of the white pigment/polymer dispersions obtained in this way were as follows:

TABLE 4

| Example 4 | Brightener in %, based on polymer | SC in % | Average particle size (nm) |
| --- | --- | --- | --- |
| a) | 0.2 | 43.8 | 542 |
| b) | 0.4 | 38.6 | 252/239 |
| c) | 0.8 | 37 | 256 |

The whitened, fine dispersions a)–c) obtained in this way were coated onto base paper using a manual knife coater (coat weight: about 20 g/m$^2$). The whitenesses of the coated papers were as follows:

TABLE 5

| Example 4) | Optical brightener in % based on polymer | Whiteness Berger | CIE |
| --- | --- | --- | --- |
| | none | 82 | 81.3 |
| a) | 0.2 | 131.4 | 130.2 |
| b) | 0.4 | 150.5 | 146.76 |
| c) | 0.8 | 162.4 | 153.9 |

The resulting stable, whitened polymer dispersion was easy to incorporate into paper coating slips and exhibited excellent white effects with high lightfastnesses, even when added in large amounts.

Example 5
(Not in Accordance with the Invention)

An unwhitened paper coating slip having a solids content of about 60% by weight, whose pH was adjusted to 9 using sodium hydroxide solution, was prepared by stirring together

| 60 parts of calcium carbonate pigment (chalk HC 90) |
| --- |
| 40 parts of kaolin pigment (china clay SPS) |
| 0.25 parts of a dispersant based on Na salt of a polycarboxylic acid |
| 10 parts of a commercial 50% polymer dispersion based on styrene-butadiene-acrylic acid copolymer (Baystal ® P from Bayer) (corresponding amounts of an acrylate-containing copolymer (Acronal ® 320 D from BASF) gave the same result) |
| 0.75 parts of polyvinyl alcohol |
| 66 parts of water. |

Example 6

For each 1 kg of the pigmented coating slip of Example 5, a) 0.025%, b) 0.05%, c) 0.1%, d) 0.2%, and e) 0.3% of a comparative brightener, based on the solids content of the coating slip of Example 5, of the formula

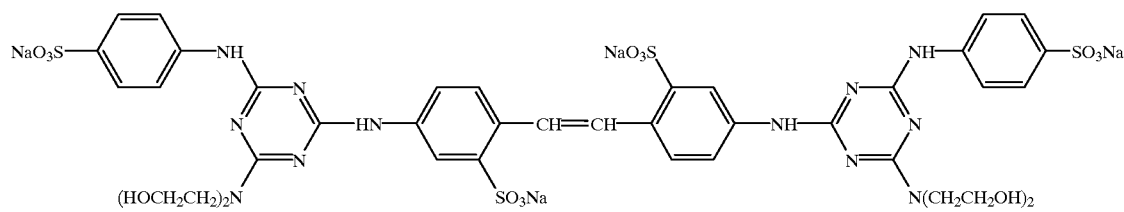

which is commonly used in paper coating slips, was added and incorporated.

In a second series of tests, f) 10%, g) 20%, h) 40% and i) 80% (amount based on solids) of the pigment dispersion (SC: 38.6%) of Example 4b) were incorporated into this coating slip.

To prepare the coated papers, the coated slips 6a)–e) (not in accordance with the invention) and 6f)–i) (Inventive Examples) are applied to base paper with the aid of a manual knife coater or an experimental coating unit and are dried at 80° C.

Table 6 shows the CIE whiteness of the papers following production and drying.

TABLE 6

| Example | Comparative optical brightener, based on solids content of the coating slip of Example 5 (in % by weight) | CIE whiteness |
|---|---|---|
| 5) | — | 69.0 |
| 6a) | 0.025 | 78.0 |
| 6b) | 0.05 | 82.4 |
| 6c) | 0.1 | 88.2 |
| 6d) | 0.2 | 91.2 |
| 6e) | 0.3 | 91.3 |
| 6f) | 0.016 | 78.7 |
| 6g) | 0.032 | 83.9 |
| 6h) | 0.064 | 90.2 |
| 6i) | 0.128 | 97.2 |

The papers coated with the coating slips 6f)–i) (Inventive Examples) exhibited very high gloss and good smoothness in comparison to the papers coated with 6a)–e) (brighteners).

Example 7

Base paper was precoated with a pigmented coating slip as in Example 5, without whitener, with an application of about 16 g/m². Subsequently, the dispersion of Example 4b) was coated as topcoat with an application of 8 g/m². The comparison used for a brightened coat was Example 6d). The lightfastnesses were determined in the xenon test in accordance with the guidelines for the determination of colorfastnesses in accordance with DIN 54 004.

TABLE 7

| Example | Pigmented slip | CIE whiteness before | 1 h after exposure | 2 h | 4 h | Drop in whiteness after 4 h of exposure |
|---|---|---|---|---|---|---|
| 5) | without brighteners | 69 | 66 | 67.5 | 67.6 | 1.4 |
| 6d) | 0.2% by weight comparative brightener | 91.2 | 83.7 | 82 | 75.2 | 16 |
| 7) | Precoat of 5) and whitened polymer dispersion (coat weight 8 g/m²) | 127.3 | 121.7 | 121.3 | 118.9 | 8.1 |

The coat furnished in this way exhibited not only high whiteness and excellent lightfastness but also high gloss and high smoothness.

Example 8

Base paper was precoated with an application of about 16 g/m² of the following pigment slip

```
100 parts of calcium carbonate pigment (chalk HC 90)
  7 parts of starch
0.25 parts of a dispersant based on Na salt of a polycarboxylic acid
     (Polysalz ® S from BASF)
  5 parts of a commercial 50% polymer dispersion based on styrene-
     butadiene-acrylic acid copolymer (Baystal ® P from Bayer) and
 72 parts of water (about 60% SC; pH: 8.8–9) a) without whitener,
     b) with 0.1% and c) with 0.2% of the comparative brightener
     from Example 6 (based in each case on the solids content of the
     coating slip).
```

Example 9

The precoated papers produced in accordance with Examples 8b) and c) with brightener were furnished with a topcoat of the following composition:

```
 80 parts of calcium carbonate pigment (chalk HC 90)
 20 parts of kaolin pigment (china clay SPS)
0.25 parts of a dispersant based on Na salt of a polycarboxylic acid
     (Polysalz ® S from BASF)
 10 parts of a commercial 50% polymer dispersion based on styrene-
     butadiene-acrylic acid copolymer (Baystal ® P from Bayer)
     (the same result was also obtained with an acrylate-containing
     copolymer (Acronal ® 320 D from BASF)
0.75 parts of polyvinyl alcohol and
 66 parts of water (SC: 60%, pH: 9) and also a) 0.25%, b) 0.5%,
     and c) 1% of the comparative brightener from Example 6(based
     in each case on the solids content of the coating slip) (about
     8-12g/m² coat weight).
```

Example 10

In a second series of experiments, the paper precoated in accordance with Example 8a) without brightener was coated with a topcoat of the following composition

```
a)   100 parts of a dispersion in accordance with Example 4b)
      20 parts of precipitated calcium carbonate (PCC)
    0.25 parts of Polysalz ® S; BASF
     0.2 parts of polyvinyl alcohol and
      59 parts of water SC: about 50%
or
b)   100 parts of a dispersion in accordance with Example 4b)
      40 parts of precipitated calcium carbonate (PCC)
    0.25 parts of Polysalz ® S
     0.2 parts of polyvinyl alcohol and
      18 parts of water SC: about 50%.
```

The papers furnished in accordance with Examples 9 and 10 were subsequently exposed at a distance of about 15 cm for 5 days using the daylight fluorescent lamp Sylvania Daylight F 20 W/DRS. The whitenesses of the coated papers before and after exposure were as follows.

TABLE 8

| Precoat Example | Topcoat Example | CIE whiteness Before exposure | After exposure | Drop in whiteness due to exposure |
|---|---|---|---|---|
| 8b) | 9a) | 95.3 | 77.6 | 17.7 |
|  | 9b) | 96.7 | 76.8 | 19.9 |
|  | 9c) | 99.5 | 74.2 | 25.3 |
| 8c) | 9a) | 95.6 | 76.9 | 18.7 |
|  | 9b) | 97.4 | 76.4 | 21 |
|  | 9c) | 99.1 | 73.9 | 25.2 |
| 8a) | 10a) | 135 | 132.9 | 2.1 |
| 8a) | 10b) | 135.4 | 132.9 | 2.5 |

Example 11

Pigmented Ink-jet Coat

Using a manual knife coater or an experimental coating unit, the following paper coating slip (pigmented slip)

```
 100 parts of a whitened polymer dispersion in accordance with
     Example 4b)
11.4 parts of precipitated silica or silica hydrogel
   1 part of polyvinyl alcohol (e.g., Mowiol ® 28-99 or 2-88, from
     Hoechst)
```

-continued 1 part of cationic additive (e.g., Additol ® VXT 3529, from Hoechst)
50 parts of water having a solids content of 30% and a pH of about 6 was applied to base paper (coat weight: 10–12 g/m²). Drying gave color-printable papers of excellent quality with a high CIE whiteness of 136.7, which are outstandingly suitable for colored and black ink-jet printing.

Example 12

In the same way as described in Example 2, the untreated polymer dispersion was treated at 98° C. for 20 minutes with a) 0.2%, b) 0.4%, c) 0.8% and d) 1% (based in each case on polymer) of the optical brightener of the formula

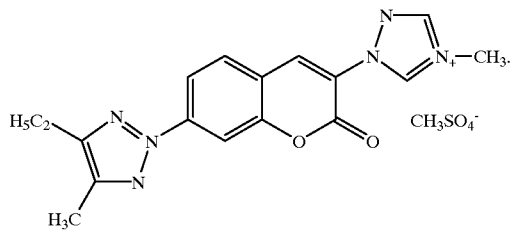

The coating of the whitened polymer dispersions prepared in this way on base paper was subsequently exposed at a distance of about 15 cm for 5 days using the daylight fluorescent lamp Sylvania Daylight F 20 W/DRS. The whitenesses of the coated papers before and after exposure were as follows.

TABLE 9

| Example 9) | Brightener in % by weight based on polymer | CIE whiteness Before exposure | CIE whiteness After exposure | Drop in whiteness due to exposure |
|---|---|---|---|---|
|  | none | 80.6 | 80.3 | 0.3 |
| a) | 0.2 | 141 | 143.3 | 0 |
| b) | 0.4 | 146 | 146.7 | 0 |
| c) | 0.8 | 145 | 144.9 | 0.1 |
| d) | 1 | 144.4 | 142.8 | 1.6 |

The maximum white yield was achieved with a whitener concentration of just 0.4%. The drop in whiteness due to exposure was within the error margin of the measuring instrument.

Example 13

Following the procedure described in Example 2 but adding, instead of the brightener from Example 1, a) 0.1%, b) 0.2%, c) 0.4% and d) 0.8% by weight, based in each case on polymeric solids fraction, of the optical brightener of the formula

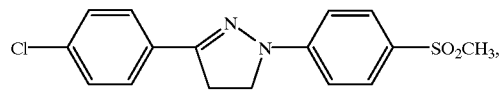

followed by workup as described, likewise gave a polymer dispersion suitable for the brightening of the paper coating slips. The whitened, fine polymer dispersion thus obtained was coated onto base paper using a manual knife coater (coat weight: about 15 g/m²). The coated papers were exposed at a distance of about 15 cm for 72 h using the daylight fluorescent lamp Sylvania Daylight F 20 W/DRS and gave the following whitenesses before and after exposure:

TABLE 10

| Example 10) | Brightener in % by weight based on polymer | CIE whiteness Before exposure | CIE whiteness After exposure | Drop in whiteness due to exposure |
|---|---|---|---|---|
|  | none | 80.6 | 80.3 | 0.3 |
| a) | 0.1 | 115.8 | 114.3 | 1.5 |
| b) | 0.2 | 144.7 | 143.5 | 1.2 |
| c) | 0.4 | 148.6 | 145.1 | 3.5 |
| d) | 0.8 | 154.8 | 152.3 | 2.5 |

As a topcoat, in a mixture with precipitated calcium carbonate, the resulting stable white pigment-polymer dispersion showed excellent white effects and was also easy to incorporate into paper coating slips. The high gloss and high smoothness of the coats are noteworthy.

What is claimed is:

1. A polymer whitened with optical brighteners obtained by
   (a) emulsion polymerizing acrylonitrile with or without a comonomer in the presence of one or more graftable substrates selected from the group consisting of
      (1) polymeric emulsifiers containing sulfonic acid groups selected from the group consisting of compounds having the formulas

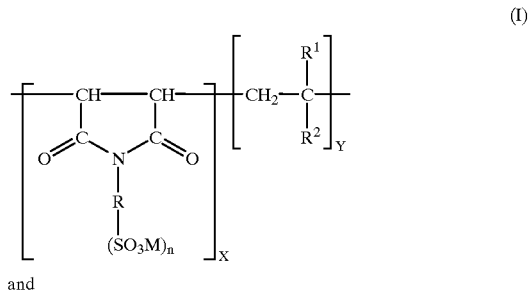

and

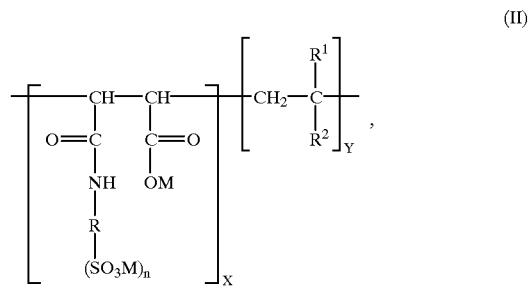

wherein
M denotes a cation-forming radical,
n is 1 or 2,
R denotes a hydrocarbon chain having 1 to 10 carbon atoms or an aromatic radical having 6 to 10 carbon atoms,
$R^1$ denotes H or $CH_3$,
$R^2$ denotes H, $C_1$–$C_{16}$ alkyl, or phenyl, and
x and y are chosen such that the average molecular weight $M_w$ of the polymers of formulas (I) and (II)

is from 2000 to 500,000 g/mol and the ratio x:y is from 1:4 to 1:1, and (2) graftable polyurethanes or oligourethanes that undergo free-radically initiated emulsion polymerization, and (b) adding an optical brightener before, during, or after the emulsion polymerization.

2. A whitened polymer according to claim 1 obtained as an aqueous dispersion.

3. A whitened polymer according to claim 1 having an average particle size of less than 1 μm.

4. A whitened polymer according to claim 1 having an average particle size of 50 to 800 nm.

5. A whitened polymer according to claim 1 wherein the acrylonitrile is emulsion polymerized with a comonomer selected from the group consisting of (1) a nonionic comonomer selected from the group consisting of alkyl esters of acrylic and methacrylic acid, ethoxylated and propoxylated esters of acrylic and methacrylic acid, styrene and α-methylstyrene and derivatives thereof, vinyl carboxylates, conjugated dienes, methacrylonitrile, vinyl chloride, vinylidene chloride, N-alkyl- and N-aryl-substituted maleimides, and hydrophilicizing comonomers;

(2) an ionic comonomer selected from the group consisting of vinylsulfonic acid and its salts, methallylsulfonic acid and allylsulfonic acid and salts thereof, styrenesulfonic acid and its salts, (2-acrylamido-2-methyl)propanesulfonic acid and its salts, (3-sulfopropyl)acrylic acid and its salts, (3-sulfopropyl)-acrylic esters, and alkyl esters and oxyalkyl esters thereof; and (3) mixtures thereof.

6. A whitened polymer according to claim 1 wherein R denotes a radical derived from a $C_1$–$C_4$ alkane radical, a —$(CH_2)_2NH(CH_2)_2$— radical, or a radical derived from benzene, methylbenzene, or naphthalene.

7. A whitened polymer according to claim 1 wherein the emulsion polymerization is carried out in the presence of a graftable polyurethane or oligourethane having a weight average molecular weight greater than 1000 g/mol obtained by reaction of a macrodiol and an oligoisocyanate having an NCO functionality greater than 2.

8. A whitened polymer according to claim 1 wherein the optical brightener is selected from the group consisting of (i)

(1)

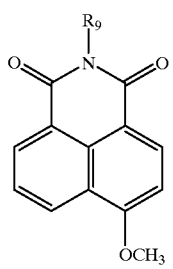

wherein
$R_4$ denotes ethyl or phenyl, and
$An^\ominus$ represents an anion;

(ii)

(2)

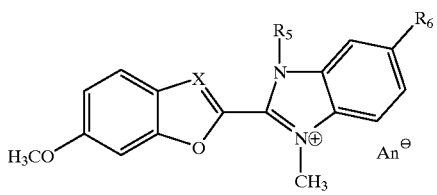

wherein
X represents CH or N,
$An^\ominus$ represents an anion,
$R_5$ represents $CH_3$ or $CH_2$—$C_6H_5$, and
$R_6$ represents H or $SO_2$—$CH_3$;

(iii)

(3)

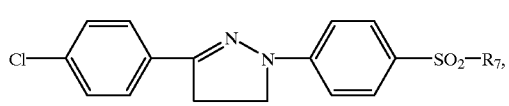

wherein
$R_7$ represents $NH_2$, $CH_3$, $C_2H_4$—OH, NH—$C_3H_6$N$(CH_3)_2$, $CH_2$—CH($CH_3$)—N($CH_3)_2$, $C_2H_4$—CONH—$C_2H_4$—N($CH_3)_2$, $C_2H_4$—O—CH($CH_3$)—$CH_2$—N($CH_3)_2$, NH—$C_3H_6$—N($CH_3)_3{}^+An^\ominus$, $C_2H_4$—N($CH_3)_3{}^+An^\ominus$, $C_2H_4$—CONH—$C_2H_4$—N($CH_3)_3{}^+An^\ominus$, $CH_2$—CH($CH_3$)—N($CH_3)_3{}^+An^\ominus$, or $C_2H_4$—O—CH($CH_3$)—$CH_2$—N ($CH_3)_3{}^+An^\ominus$, where $An^\ominus$ represents an anion;

(iv)

(4)

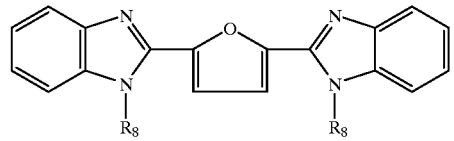

wherein
$R_8$ denotes H or $CH_3$; and (v)

(5)

wherein

R₉ represents $CH_3$, $CH_2C(CH_3)_2-CH_2-N(CH_3)_3{}^+An^\ominus$, or

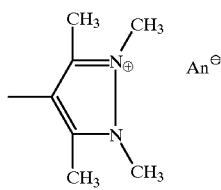

where $An^\ominus$ denotes the anion of a mineral acid or $-O_3SOCH_3$.

9. An aqueous dispersion containing from 31 to 65% by weight, based on the dispersion, of a polyacrylonitrile and/or acrylonitrile copolymer whitened with an optical brightener according to claim 1.

10. An aqueous dispersion comprising
    (a) 1 to 65% by weight of whitened polymer according to claim 1, and
    (b) 1 to 15% by weight of surface-active substances, based on whitened polymer.

11. An acrylonitrile homopolymer or copolymer whitened with an optical brightener obtained by
    (a) emulsion polymerizing acrylonitrile with or without a comonomer in the presence of one or more graftable substrates selected from the group consisting of
        (1) a polymeric emulsifier containing sulfonic acid groups selected from the group consisting of compounds of formulas (I) and (II)

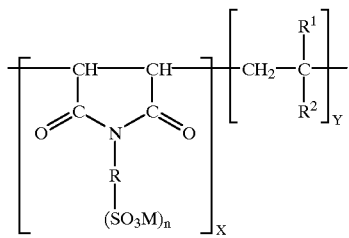  (I)

and

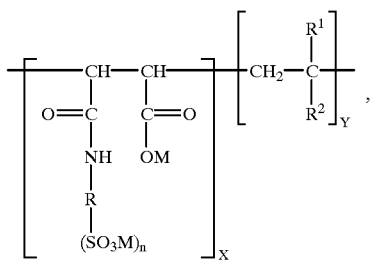  (II)

wherein

M denotes a cation-forming radical, n is 1 or 2,

R denotes a hydrocarbon chain having 1 to 10 carbon atoms or an aromatic radical having 6 to 10 carbon atoms, $R^1$ denotes H or $CH_3$, $R^2$ denotes H, $C_1-C_{16}$ alkyl, or phenyl, and x and y are chosen such that the average molecular weight $M_w$ of the polymers of formulas (I) and (II) is from 2000 to 500,000 g/mol and the ratio x:y is from 1:4 to 1:1, and (2) a graftable oligourethane that undergoes free-radically initiated emulsion polymerization, and
(b) adding an optical brightener before, during, or after the emulsion polymerization.

12. An aqueous coating slip comprising
    (1) a whitened polymer according to claim 1,
    (2) an inorganic pigment, and
    (3) one or more binders.

13. A method for coating a substrate comprising applying an aqueous coating slip according to claim 12 to said substrate.

14. A method according to claim 13 wherein the substrate is paper, photographic paper, paperboard, wood, polymer films, textiles, or stone.

15. A substrate coated with an aqueous coating slip according to claim 12.

* * * * *